Aug. 22, 1944.   C. A. OLSON ET AL   2,356,175
GRINDER ATTACHMENT
Filed Aug. 3, 1940   4 Sheets-Sheet 3
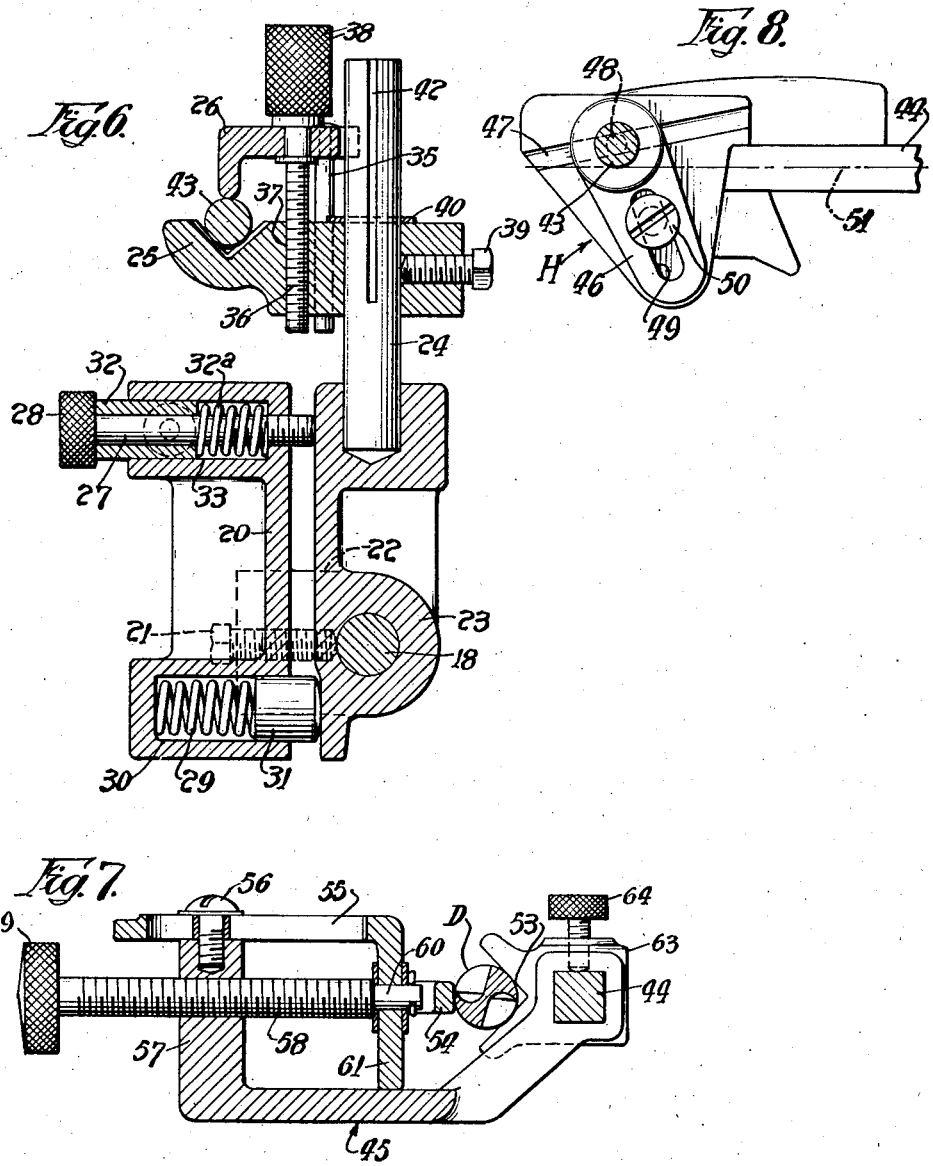
Witness:
E. Campouni
Inventors:
Carl A. Olson,
Charles V. Lisle, and
Thomas E. Brooks,
By: Bair & Freeman
Attorneys

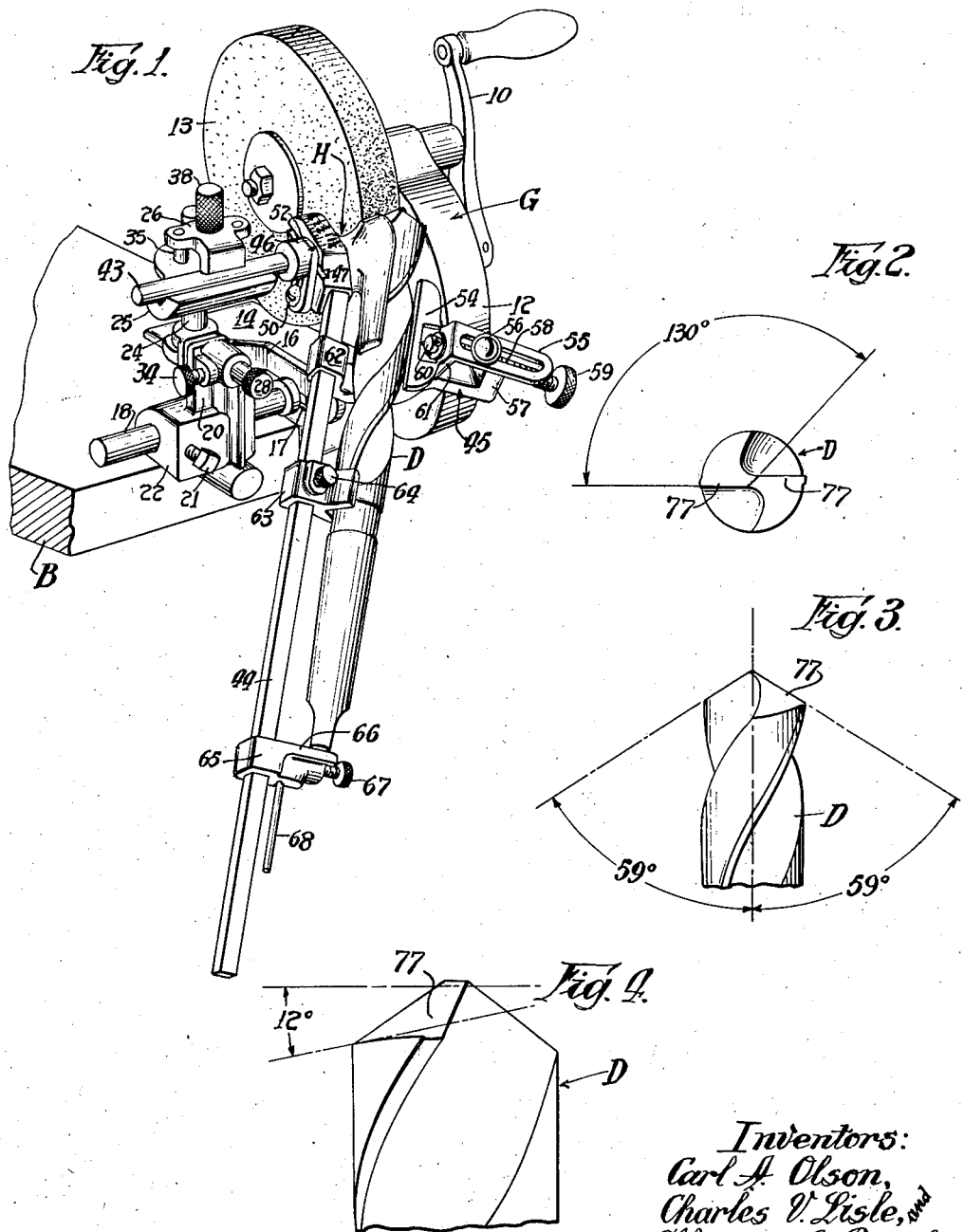

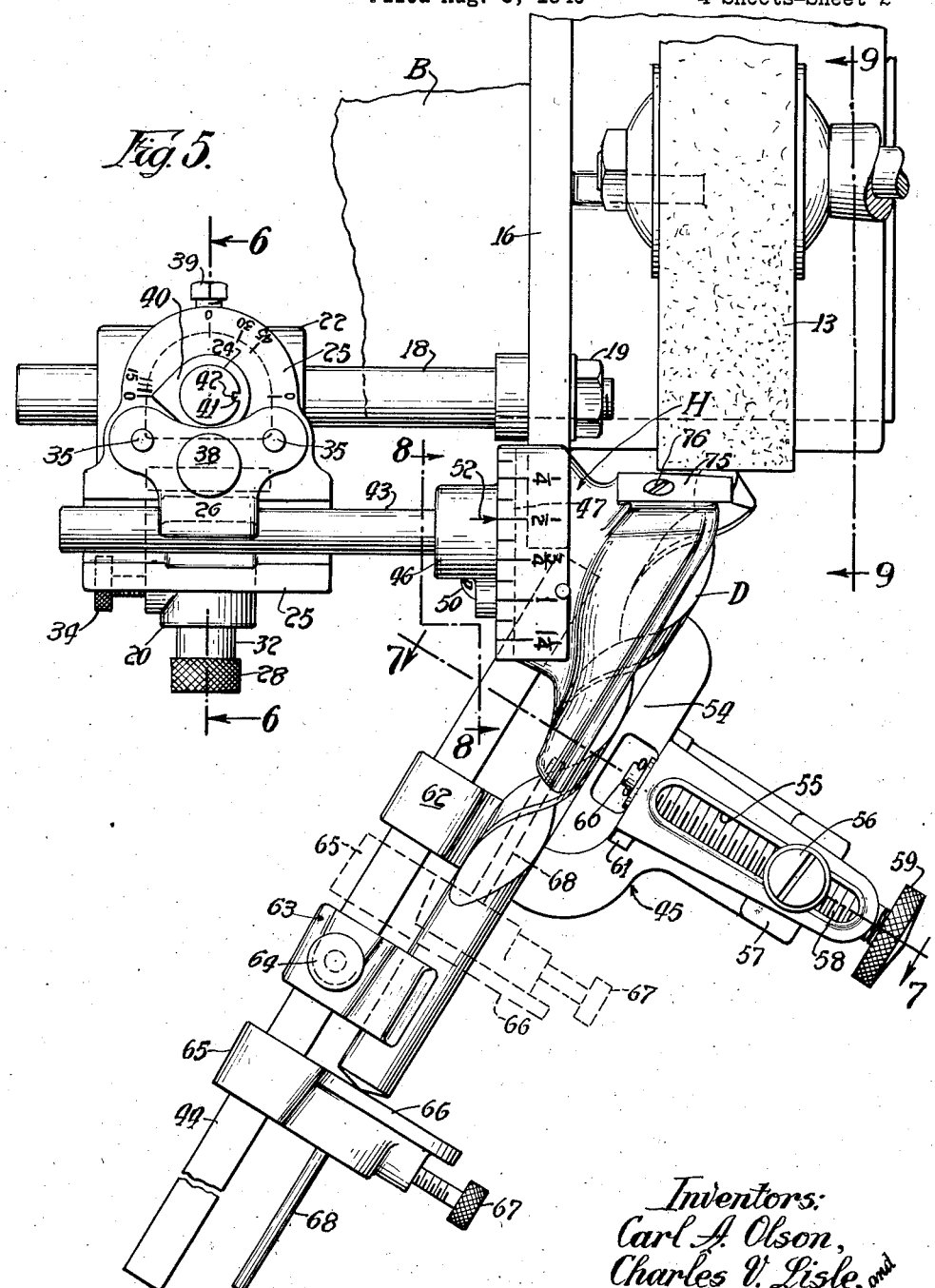

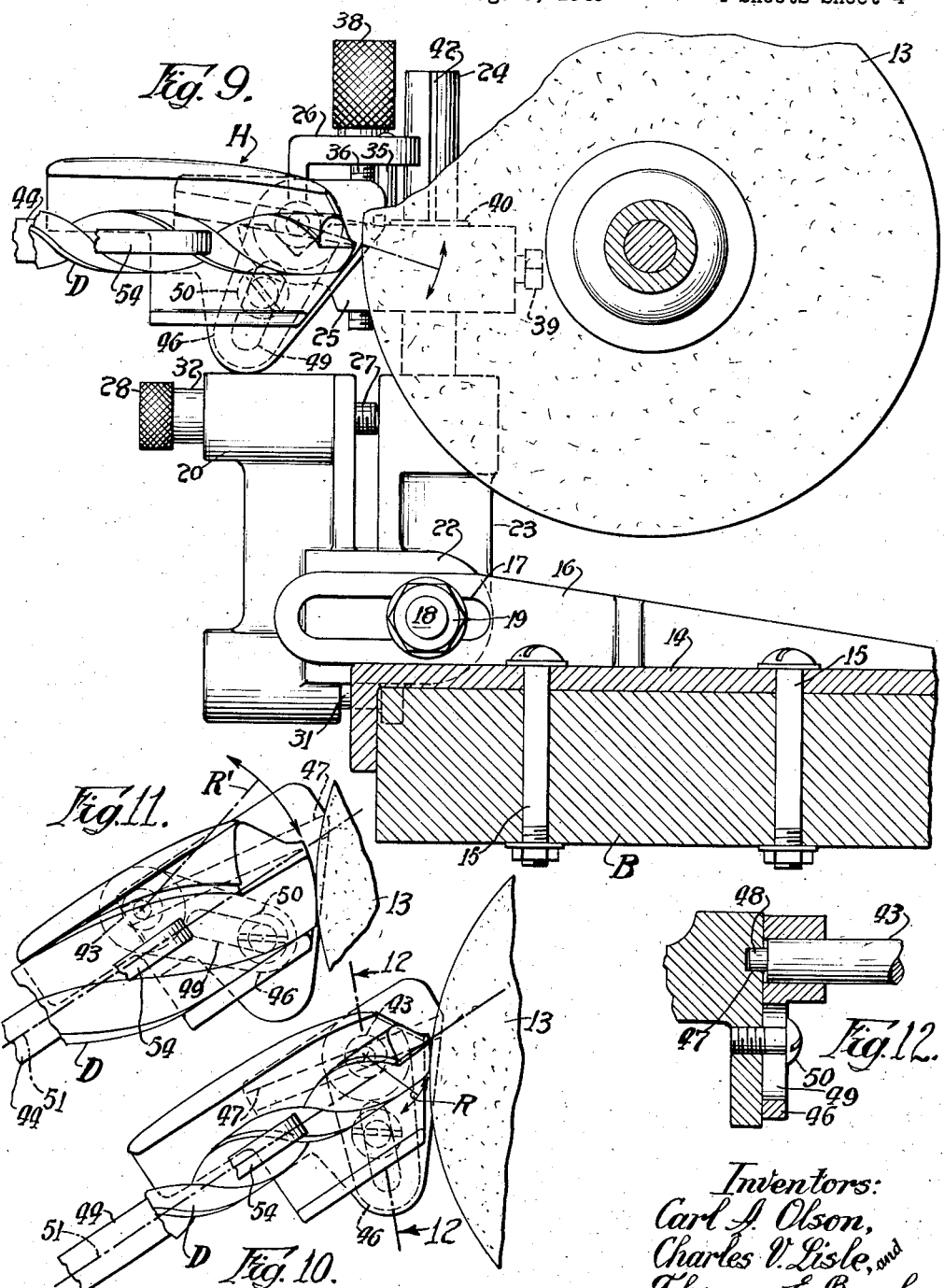

Patented Aug. 22, 1944

2,356,175

UNITED STATES PATENT OFFICE 2,356,175

GRINDER ATTACHMENT

Carl A. Olson, Charles V. Lisle, and Thomas E. Brooks, Clarinda, Iowa, assignors to Lisle Corporation, Clarinda, Iowa, a corporation of Iowa Application August 3, 1940, Serial No. 350,204

6 Claims. (Cl. 51—219)

An object of our invention is to provide a grinder attachment which may be readily attached to a hand or power grinder and which includes mechanism for holding drills and other articles to be ground, the attachment being comparatively simple and inexpensive to manufacture.

Another object is to provide a grinder attachment including a V clamp which may receive either a drill holder or any rod-like article, adaptable to be rotated during the grinding operation to secure substantially uniform grinding of the article about its axis of rotation.

Another object is to provide a drill holder which holds the drill at the proper angle for grinding both cutting lips of the drill at the same angle, the holder including an end stop for the drill to insure that both lips will be ground to the same length and a stop lip to engage each cutting lip of the drill successively to further insure uniformity of grinding.

Another object is to provide the drill holder with a shank which is oscillatable in the V clamp so that the drill may be swung about the axis of the shank for grinding all portions of the end of the cutting lip, the relation of the axis of the drill and the axis of rotation of the shank being such as to insure the proper clearance angle and contour of the cutting lip both at its cutting edge and at the heel thereof.

Still another object is to provide the drill holder with an adjustable shank so that the shank may be adjusted relative to the drill point both as to distance from the point to the axis and distance between the shank axis and the drill axis which are off-set relative to each other.

Still a further object is to provide an adjustable connection between the shank and the drill holder which includes a clamp screw and a slot that receives an extension on the end of the shank, the slot being inclined and off-set relative to the axis of the drill so that as the drill holder is adjusted for a larger size drill the distance between the drill and shank axis is increased.

Another object of our invention is to provide means to feed the drill relative to the grinder including a slidable sleeve which can be fixed in a predetermined position after one cutting lip grinding operation so that the second cutting lip can be ground to exactly the same degree as the first one, thereby contributing to the accuracy of grinding a drill on both lips.

Still another object is to provide a holder for articles to be ground which in addition to being adapted for grinding drills properly may constitute a holder for lathe tools and the like for rigidly holding them relative to the grinding face of the grinder and feeding them relative thereto at a desired slow and even rate of feed.

Other objects, purposes and characteristic features of the present invention will be in part obvious from the accompanying drawings and in part pointed out as the description of the invention progresses. In describing the invention in detail, reference will be made to the accompanying drawings in which like reference characters designate corresponding parts throughout the several views, and in which:

Figure 1 is a perspective view of a grinder attachment embodying our invention and showing it mounted with relation to a hand grinder.

Figure 2 is an end elevation of a drill showing the usually accepted requisite for the center angle of the drill.

Figure 3 is a side elevation of the cutting end of the drill showing the usually accepted cutting lip angles and the contour of the periphery of the cutting lip.

Figure 4 is an enlarged view similar to Figure 3 and at right angles thereto showing the generally accepted clearance angle at the heel of the cutting lip and the contour of the periphery of the cutting lip relative thereto.

Figure 5 is a plan view of Figure 1 on an enlarged scale.

Figure 6 is a sectional view on the line 6—6 of Figure 5 showing the details of a stop bracket and V clamp of our attachment.

Figure 7 is an enlarged sectional view on the line 7—7 of Figure 5 showing a clamp for a drill.

Figure 8 is a sectional view on the line 8—8 of Figure 5 showing the construction of a shank and a head which are adjustably connected with each other in a peculiar manner.

Figure 9 is a sectional view as on the line 9—9 of Figure 5 showing a drill being ground in our grinder attachment.

Figure 10 is a view of a portion of Figure 9 showing the drill holder swung to a different position during the grinding operation.

Figure 11 is a similar view showing a larger drill being ground; and

Figure 12 is a sectional view on the line 12—12 of Figure 10.

On the accompanying drawings we have used the reference character B to indicate a work bench or the like on which a grinder G is mounted. The grinder G is illustrated as an ordinary hand grinder including a crank 10, a gear casing 12 and an abrasive wheel 13.

We provide a base 14 to be mounted on the bench B and if desired secured thereto as by bolts 15 as shown in Figure 11. Most grinders G include a C clamp (not shown) for mounting the grinder on the bench B and base 14 which C clamp may be utilized to hold the base 14 in position if it is to be readily removable and the bolts 15 are to be dispensed with.

The base 14 has a flange 16 provided with a slot 17. A way rod 18 extends through the slot and is held in rigid relation to the flange 16 and base 14 by a lock nut 19. The slot 17 permits adjustment of the way rod 18 toward and away from the abrasive wheel 13.

Slidably mounted on the way rod 18 is a stop bracket 20 (see Figure 6). The bracket 20 is provided with a set screw 21 to normally fix the stop bracket relative to the way rod. The set screw 21 is carried by one of a pair of spaced ears 22 between which a supporting bracket 23 is oscillatably mounted. The supporting bracket 23 has a rod 24 pressed thereinto on which is mounted a V clamp comprising a V seat member 25 and a clamping dog 26.

The supporting bracket 23 and the V clamp are biased to engage a set screw 27 having a knurled head 28. The bias is produced by a spring 29 located in a socket 30 of the stop bracket and pressing against a pin 31. The pin 31 in turn engages a portion of the supporting bracket 23.

The set screw 27 is threaded in the stop bracket 20 and a slidably mounted sleeve 32 is provided surrounding it. The sleeve 32 is slidable in a bore 33 of the stop bracket 20 and is normally fixed against such sliding movement by a set screw 34.

The clamp dog 26 is provided with a pair of pins 35 extending downwardly therefrom and slidable in perforations of the V seat 25. A clamp screw 36 is threaded in an opening 37 of the V seat 25 and is rotatable and non-slidable in the dog 26. The clamp screw 36 is provided with a knurled head 38.

The V seat 25 is normally retained against sliding movement and rotation relative to the rod 24 by a set screw 39. A sheet metal pointer 40 is slidably mounted on the rod 24 and has a lug or tongue 41 entering a key-way 42 thereof. Cooperating with the pointer 40, indicia indicating degrees may be impressed on the upper surface of the V seat 25 as shown in Figure 5.

A drill holder including a shank 43, a supporting rod 44 and a drill clamp 45 is provided. The shank 43 is adapted to be received in the V clamp 25—26 for oscillation therein. The supporting rod 44 is connected with the shank 43 by means of a head H and an arm 46. The head H is provided with a slot 47 which receives a reduced end 48 of the shank 43 as shown in Figures 8 and 14. The shank is a press fit in the arm 46 and the arm is slotted as at 49.

Extending through the slot 49 is a clamp screw 50 threaded into the head H. The slot 47, it will be noted, is inclined relative to a center line 51 in Figure 8, which center line represents the center line or axis of rotation of the drill as will hereinafter appear. The slot 47 in addition to being so inclined is throughout its entirety off-set from the line 51 for a purpose which will hereinafter appear.

An indicating mark 52 is provided on the arm 46 (see Figure 5). The mark 52 is adapted to coact with indicia such as ¼, ½, etc., appearing in this figure on the head H. The purpose of these indicia will hereinafter appear.

The head H includes a V seat 53 for a drill indicated at D (see Figure 7). The drill is held against the seat 53 by the drill clamp 45 which includes a clamp blade 54. The clamp blade 54 has a slotted extension 55 through which a screw 56 extends into a flange 57 of the drill clamp. The clamp blade 54 and its extension 55 are thereby slidably mounted relative to the drill clamp 45.

A clamping screw 58 is threaded in the flange 57 and has a knurled operating head 59. The inner end of the clamping screw 58 indicated at 60 is shouldered and rotatably and non-slidably mounted in a flange 61 of the clamp blade 54. The drill clamp 45 has a perforated boss 62 slidably mounted on the supporting rod 44 to enable positioning of the clamp blade 54 at different positions for different lengths of drills.

On the front face of the head H or the face next to the grinding face of the wheel 13 we provide a stop lip 75 in the form of a flat blade held in position by a countersunk screw 76. The drill D, when in the drill clamp 45, is adapted to have one of its cutting lips engaging the stop lip 75 as illustrated and as will hereinafter be described.

A drill holder 63 is also slidably mounted on the supporting rod 44. The drill holder is of V seat construction and adapted to support a relatively large drill. A set screw 64 is provided for locking the drill holder 63 in any desired position on the rod 44. On relatively short drills the holder 63 can be slid off the rod and its use dispensed with.

An end stop 65 is also slidable on the supporting rod 44 and includes a faced stop flange 66. A set screw 67 is provided for locking the end stop 65 in any desired position. A rod 68 extends from the end stop 65 and is adapted for serving as an end stop for short drills in a manner which will hereinafter be described.

*Practical operation*

The grinder G is located relative to the base 14 and the way rod 18 is located relative to the slot 17 so that the V clamp 25—26 will hold the shank 43 at a position somewhat spaced from the grinding face of the wheel 13, as shown in Figure 11, with the rod 24 of the V clamp substantially perpendicular to the upper face of the bench B. The stop bracket 20 is adjusted outwardly on the way rod 18 to a position where a drill held against the V seat 53 of the head H by the drill clamp 45 may contact with the grinding face of the wheel 13 and the shank 43 may be slid back and forth in the V clamp 25—26 so that the cutting end of the drill can be made to traverse the entire width of the grinding face.

The drill is held in the drill clamp 45 with its cutting end projecting about 1/16 inch beyond the stop lip 75 plus a distance equal to the amount to be ground from the drill. The grinding operation is started with the drill clear of the grinding face of the wheel as shown in Figure 11. The drill D is rotated in the drill clamp before the clamp is tightened to a position with one of its cutting lips 77 engaging the stop lip 75. The end stop 65 is adjusted with its faced flange 66 in snug engagement with the shank end of the drill. Depending on the size of the drill the arm 46 is adjusted relative to the head H in accordance with the indicia on the head and the indicating mark 52 on the arm 46. For instance, in Figure 1 a ¼ inch drill is being ground and the indicating mark 52 corresponds with the indicia ¼, while in Figure 5 a half-inch drill is being ground and the indicia ½ is used.

The grinder G may now be operated and during its operation the drill holder oscillated on the axis of the rod 43 by grasping the rod 44 and swinging it up and down. As the drill holder is oscillated the set screw 28 may be rotated clockwise by swinging the V clamp 25—26 toward the axis of rotation of the grinding wheel. This feeds the drill against the grinding face of the wheel and the degree and speed of feed may be readily adjusted as desired by the operator in his manipulation of the knurled head 28 of the set screw 27.

When the first ground lip of the drill has been ground sufficiently the set screw 34 may be tightened for locking the sleeve 32 against further sliding movement. The sleeve 32 is normally biased outwardly by a spring 32a so as to engage against the head 28. Locking the sleeve in position predetermines the amount that the set screw 27 can be retightened again after it is loosened for the purpose of backing the drill away from the grinder.

After the drill has been backed away from the grinder the knurled head 59 of the drill clamp 45 may be manipulated for releasing the drill whereupon it may be rotated a half-turn, engaged snugly with the flange 66 of the end stop 65 and arranged with its second cutting lip engaging against the stop lip 75. Thereupon the drill clamp 45 may be retightened with the assurance that the drill is being held in exactly a similar position but rotated a half-turn.

The grinder G may again be operated and the set screw 27 rotated clockwise to feed the drill against the grinding face for grinding the second cutting lip of the drill. During the grinding the drill is oscillated on the axis of the shank 43 as already described in connection with grinding the first cutting lip of the drill. The degree of oscillation is preferably sufficient to disengage the drill from the grinder at both the upper and lower limits of oscillation. When the head 28 of the set screw 27 engages the sleeve 32, then the operator knows that the degree of feed is sufficient to make the length of the second ground lip exactly equal to the length of the first ground lip of the drill.

Our grinding attachment is so designed that the angular relation between the supporting rod 44 and the shank 43 is 59 degrees, which as indicated in Figure 3, is the generally accepted angle for average working conditions. Also, the angle of the center point (130 degrees, as shown in Figure 2) automatically results from the use of our attachment.

One of the main requisites of a properly ground drill is that the heel of the cutting lip shall be 12 degrees to a line at right angles to the axis of rotation as shown in Figure 4 and that the contour of the periphery of the cutting lip shall be as shown in this figure. This necessitates a grinding of the advance end of the cutting lips 77 on a radius when viewing the drill in the direction of the arrows 11, 11 of Figure 5, such angle of view being shown in Figures 9, 10 and 11. This radius is indicated in Figure 10 as R and in Figure 11 as R'. A half-inch drill is illustrated in Figure 10 while a 1¼ inch drill is illustrated in Figure 11. It is necessary that as the size of the drill increases the size of the radius also increases as is obvious from comparing R with R'. This is necessary in order to secure the proper clearance angle of 12 degrees at the heel of the cutting lip and the proper peripheral contour of the cutting lip as shown in Figure 4.

For the same reason it is also necessary to have the axis of rotation for the radius R closer to the axis of rotation of the drill D in Figure 10 than it is to the axis of rotation of the drill in Figure 11. Accordingly, in changing the setting of our attachment for different sized drills both the spacing between (1) the cutting point of the drill and the axis of oscillation of the shank 43 and (2) the axis of the drill and the shank must be taken into consideration and provided for.

This is accomplished by the peculiar adjustable attachment of the head H to the shank 43 as best illustrated in Figure 8. The shank travels in the slot 47 as the adjustment is changed by swinging the arm 46 toward or away from the left hand end of the head H. This end is the end at which the cutting end of the drill is held.

It will be noted that the shank 48 is always spaced from the axis 51 of the drill (which can also be seen in Figures 10 and 11) and as the distance from the left end of head to the shank 43 and its reduced extension 48 increases the distance between the center of the shank and the line 51 also increases as a result of inclination of the slot 47.

Accordingly, by arranging the slot at the proper inclination relative to the axis 51 and at the proper distance therefrom throughout its length in proportion to the position to which the arm 46 is swung, the distance between the shank axis and the drill point and between the shank axis and the drill axis are both changed automatically and in the proper proportion without further thought on the part of the operator over and above merely adjusting the arm 46 so that it corresponds to the proper size of drill being ground.

The operations thus far described presuppose a grinding face on the wheel 13 which is perfectly true and parallel to the axis of the shank 43. If such is not the case the drill can still be ground at the proper angle and contour by working the drill back and forth across the face of the grinder during the oscillation thereof, which of course is permitted by the slidability of the shank 43 in the V clamp 25—26. The dog 26 is adjusted to a point where it permits of such oscillation and sliding movement yet eliminates any wobbling by keeping the shank against both faces of the V seat 25.

In some instances drills may be found too short to permit of use of the drill holder 63 without interference with the end stop 65. The drill holder may in such a case be taken off and its use dispensed with. It may also be taken off where it interferes with the square shanks of blacksmith drills and the like.

In the event a drill is to be sharpened, which is shorter than the distance from the back edge of the boss 62 of the drill clamp 45 to the grinding face of the grinder the end stop 65 may be reversed as shown by dotted lines in Figure 5 and the end of the pin 68 thereon enters the V seat 53 of the drill clamp and serves as an end stop.

Various tools may be held in the V clamp 25—26 such as lathe tools and the like and presented at any desired angle to the grinder. The set screw may be manipulated to feed them against the grinder and sets of tools may be ground to the same degree as determined by the sleeve 32 in the manner heretofore described in connection with grinding drills.

Our invention has been described in the foregoing specification and illustrated in the drawings more or less precisely as to details. It is to be understood, however, that changes may be made in the arrangement and proportions of parts and equivalents may be substituted without departing from the spirit and scope of the invention as set forth in the appended claims.

What we claim as our invention and desire to secure by Letters Patent of the United States is:

1. In a grinder attachment, a supporting member, a work carrier member movable relative thereto, means for adjusting said work carrier member relative to said supporting member comprising a set screw coacting with one of said members to limit movement thereof relative to the other member, a sleeve mounted in one of said members and surrounding said set screw, said sleeve being slidable in said last member and biased to engage said set screw and thereby to limit its longitudinal movement, and means for locking said sleeve against sliding movement relative to the member in which it is mounted.

2. In a grinder attachment, a way rod arranged substantially parallel to the axis of rotation of a grinder, a stop bracket pivoted on said way rod, means for normally locking said stop bracket thereon against pivotal movement, a work supporting V clamp pivoted to said way rod, means for adjusting said V clamp pivotally on said way rod and relative to said stop bracket, comprising resilient means urging said V clamp toward said stop bracket, a set screw to limit such movement, a sleeve surrounding said set screw, said sleeve being slidable in said stop bracket and biased to engage the head of said set screw, and means for locking said sleeve against sliding movement relative to said bracket.

3. In a grinder attachment, a base adapted for mounting a grinder thereon, a way rod extending from said base and arranged substantially parallel to the axis of rotation of the grinder, a stop on said way rod, a V clamp pivoted to said way rod, means for adjusting said V clamp pivotally on said way rod and relative to said stop bracket comprising resilient means urging said V clamp toward said stop bracket, a set screw to limit such movement, a sleeve surrounding said set screw, said sleeve being slidable in said stop bracket and biased to engage the head of said set screw, and means for locking said sleeve against sliding movement relative to said bracket.

4. In a device of the class described, a support adjacent a grinder, a shank pivoted to said support and thereby providing an axis of oscillation for a drill holder, a drill holder having a slot to receive said shank whereby said axis of oscillation, in all positions of the shank relative to the slot, passes through the slot, a slotted arm extending laterally from said shank, a clamp screw carried by said drill holder and coacting with the slot of said arm to retain the arm in any position of adjustment of said shank relative to said slot in said drill holder, an end stop movable relative to said drill holder, means for fixing said end stop in a position with the cutting end of the drill projecting beyond said drill holder, a stop to engage the drill to predetermine its position of rotation relative to said drill holder, the axis of a drill when in said holder being at an angle to the axis of said slot whereby said drill axis is variable by shifting said shank along said slot to increase the distance from the cutting end of the drill to said axis of oscillation whereby to increase the radius of the arc on which the cutting lip of a larger drill is ground as a result of swinging of said drill holder on said axis of oscillation, said drill holder and shank having coacting indicia to indicate the proportional distance of the cutting edge of the drill from the axis of the shank in terms of drill sizes.

5. In a device of the class described, a support adjacent a grinder, a shank pivoted to said support and thereby providing an axis of oscillation for a drill holder, a drill holder having a slot to receive said shank whereby said axis of oscillation, in all positions of the shank relative to the slot, passes through the slot, a slotted arm extending laterally from said shank, a clamp screw carried by said drill holder and coacting with the slot of said arm to retain the arm in any position of adjustment of said shank relative to said slot in said drill holder, the axis of a drill when in said holder being at an angle to the axis of said slot whereby said drill axis is variable by shifting said shank along said slot to increase the distance from the cutting end of the drill to said axis of oscillation whereby to increase the radius of the arc on which the cutting lip of a larger drill is ground as a result of swinging of said drill holder on said axis of oscillation.

6. In a device of the kind disclosed, a support adjacent a grinder, a shank rotatably supported thereby and constituting an axis of rotation for a drill holder, a lateral arm on said shank, a drill holder pivoted to said arm through a slot and clamp screw connection, said drill holder having a slot receiving the end of the shank whereby said slot determines the axis of oscillation of the drill holder in direct relation to said shank, an end stop for a drill on said drill holder, means for fixing said end stop in a position with the cutting end of the drill projecting beyond said drill holder, a stop to engage the drill to predetermine its position of rotation relative to said drill holder, said slotted connection being on one side of the axis of the drill so that the cutting end of the drill is ground with an increasing depth from cutting edge to trailing edge of the lip of the drill and said slotted connection being inclined relative to the axis of the drill to space the shank axis farther from the drill axis for a larger drill than for a smaller one.

CARL A. OLSON.
CHARLES V. LISLE.
THOMAS E. BROOKS.